United States Patent [19]
Ploss

[11] 4,369,011
[45] Jan. 18, 1983

[54] PRELOADED BALL SCREW ASSEMBLY

[75] Inventor: Helmut Ploss, Stuttgart, Fed. Rep. of Germany

[73] Assignee: Warner Electric Brake & Clutch Company, South Beloit, Ill.

[21] Appl. No.: 174,214

[22] Filed: Jul. 31, 1980

[51] Int. Cl.³ .............................................. F16B 39/12
[52] U.S. Cl. .................... 411/223; 74/424.8 R; 411/436
[58] Field of Search ............... 411/226, 224, 222, 436, 411/427, 103, 105, 109, 110, 223; 74/424.8, 441, 459

[56] References Cited

U.S. PATENT DOCUMENTS

| | | | |
|---|---|---|---|
| 1,394,880 | 10/1921 | Badois et al. | 411/223 |
| 2,079,028 | 5/1937 | Nemec | 411/222 |
| 2,978,920 | 4/1961 | Sears et al. | 74/441 |
| 3,369,422 | 2/1968 | Sears | 74/424.8 |
| 3,608,393 | 9/1971 | Nilsson | 74/424.8 |
| 3,608,393 | 9/1971 | Nilsson | 74/424.8 |
| 3,851,541 | 12/1974 | Ploss et al. | 74/459 |
| 4,026,341 | 5/1977 | Menke | 411/103 |

FOREIGN PATENT DOCUMENTS

| | | |
|---|---|---|
| 1151420 | 3/1960 | Fed. Rep. of Germany . |
| 1934840 | 2/1970 | Fed. Rep. of Germany . |
| 1417652 | 12/1975 | United Kingdom . |

*Primary Examiner*—Ramon S. Britts
*Attorney, Agent, or Firm*—Leydig, Voit, Osann, Mayer & Holt, Ltd.

[57] ABSTRACT

Ball nuts are preloaded onto a ball screw by rotating the nuts relative to one another to jam adjacent end faces of the nuts together. Thereafter, the nuts are held against relative rotation by tightening a clamping ring secured to one of the nuts and adapted to frictionally engage the other nut to prevent rotation thereof.

5 Claims, 2 Drawing Figures

PRELOADED BALL SCREW ASSEMBLY

BACKGROUND OF THE INVENTION

This invention relates to a ball screw assembly of the type in which a pair of axially alined ball nuts are adapted to be preloaded on a ball screw. The preloading may be effected either by rotating one of the nuts toward the other nut to jam adjacent end faces of the nuts together or by rotating the nuts apart and then forcing the nuts axially toward one another. Thereafter, the nuts are locked against relative rotation in order to maintain the preload.

Various arrangements have been devised for locking the nuts against relative rotation after the preloading has been effected. Some prior arrangements require that the nuts be turned to predetermined relative angular positions before locking can be achieved. Other arrangements allow the nuts to be locked together regardless of their relative angular positions (i.e., stepless locking). Such stepless arrangements are of complex structure and, in some cases, require considerable time to effect the preloading and locking.

SUMMARY OF THE INVENTION

The general aim of the present invention is to provide a new and improved ball screw assembly in which stepless preloading and locking of the nuts may be effected, the assembly being simpler in construction and easier to preload and lock than prior stepless assemblies. In addition, the assembly is comparatively stable under low preload conditions, possesses relatively high axial stiffness and enables the use of nuts whose end faces have a comparatively small area.

A more detailed object is to achieve the foregoing by providing a ball screw assembly in which a comparatively simple frictional locking member may be tightened to hold the nuts against relative rotation after preloading has been effected and regardless of the relative angular positions of the nuts.

The invention also resides in the provision of a locking member in the form of a ring adapted to be drawn into frictional engagement with one of the nuts to prevent relative rotation of the nuts.

These and other objects and advantages of the invention will become more apparent from the following detailed description when taken in conjunction with the accompanying drawings.

DETAILED DESCRIPTION OF THE PREFERRED EMBODIMENTS

Figure 1:
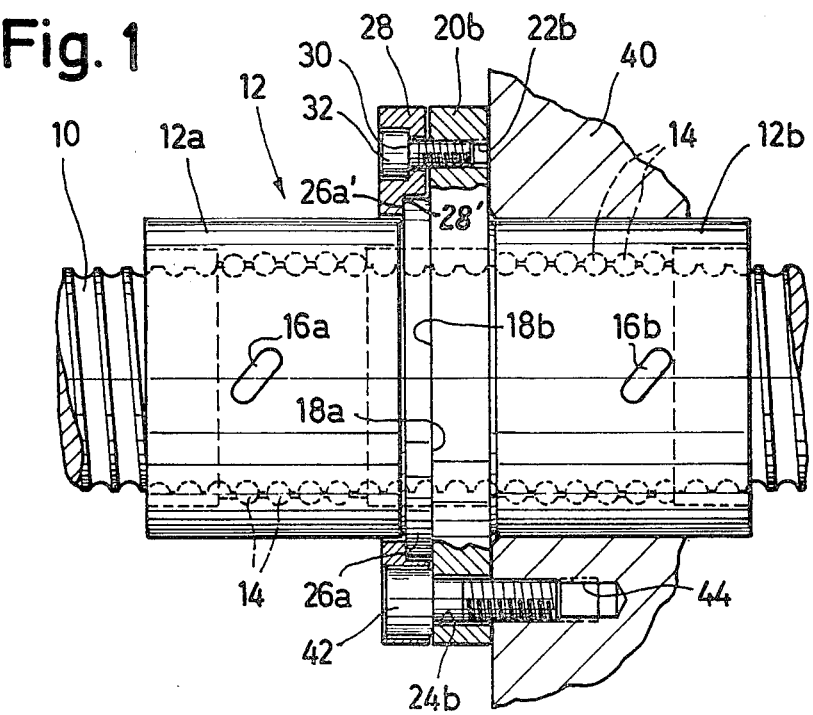
FIG. 1 is a side elevational view of one embodiment of a new and improved ball screw assembly incorporating the unique features of the present invention, part of the assembly being broken away and shown in section.

As shown in the drawings for purposes of illustration, the invention is embodied in a ball screw assembly comprising a screw 10 and a multisectional nut 12 consisting substantially of two separate and axially alined nuts 12a and 12b. Circulating in the helical grooves or races of the screw and the nuts are balls 14 which are made to return in a known manner from one race to, for example, the one immediately adjacent it, by ball transfer members 16a and 16b provided in the walls of the nuts 12a and 12b. In this way, rotational movement of one part, for example, the screw 10, is converted into linear displacement of the other part, in this case, the multisectional nut 12.

It is desirable to elastically deform or preload the balls 14 in the races in order to take up axial play or backlash between the balls and the races and increase the axial stiffness of the ball screw assembly. Preloading preferably but not necessarily is effected by rotating one of the nuts (e.g., the nut 12a) along the screw 10 and toward the other nut 12b in order to jam the adjacent planar end faces 18a and 18b of the nuts 12a and 12b, respectively, tightly against one another. Such jamming creates oppositely directed forces and causes the balls of the two nut portions to contact opposite flanks of the races in a known manner as disclosed, for example, in U.S. Pat. No. 3,851,541. After the nuts have been jammed together, they are locked against relative rotation in order to maintain the preload.

The degree of preloading depends upon how tightly the nuts 12a and 12b are jammed together and this depends upon the relative angular positions of the nuts. As the balls and races wear, the relative angular positions of the nuts must be changed to maintain the same degree of preload. The preloading is set in accordance with the stiffness requirements of various applications and must be set not only after initial installation of the assembly but also after the assembly has been serviced or repaired.

In accordance with the present invention, the two nuts 12a and 12b are held against relative rotation by extremely simple stepless locking means which frictionally engage one of the nuts in a unique manner. When the locking means are loosened, the one nut may be rotated to any desired angular position relative to the other nut to effect the desired degree of preloading. The locking means then may be tightened into frictional engagement with the one nut to hold the latter in the desired position and prevent relative rotation between the nuts.

More specifically, the nut 12b of the embodiment shown in FIG. 1 comprises an integral flange 20b formed with axially extending and angularly spaced threaded bores 22b which alternate with non-threaded bores 24b. In carrying out the invention, the other nut 12a is formed with an annular collar 26a which is engaged by a locking member in the form of a clamping ring 28 having non-threaded bores 30. The clamping ring 28 is telescoped over the nut 12a and can be tightened by threaded connectors or clamping screws 32 screwed into the threaded bores 22b so as to press the ring frictionally against the collar 26a and to press the end faces 18a and 18b into frictional engagement. For this purpose, the clamping ring 28 and the collar 26a are of such dimensions that the ring is spaced from the flange 20b both at the beginning and at the end of the clamping procedure. When the clamping screws 32 are tightened, a clamping surface 28' of the clamping ring 28 is tightened against an annular clamping surface or shoulder 26a' of the annular collar 26a of the nut 12a so that the end faces 18a and 18b are pressed against each other. The multisectional nut 12 is secured to a machine housing 40 or the like by screws 42 which extend through the bores 24b and into threaded bores 44 in the machine housing.

To effect the preloading, the screws 32 are loosened to permit the nut 12a to rotate relative to the clamping ring 28 and the nut 12b. While the nut 12b is being held against turning by the machine housing 40, the nut 12a is turned by a wrench and in a direction to thread the nut 12a axially toward the nut 12b. After the end face 18a of the nut 12a first engages the end face 18b of the nut 12b, turning of the nut 12a is continued to jam the end faces together and preload the balls 14 and the nuts 12a and 12b. The degree of preload depends upon the distance through which the nut 12a is turned after its end face 18a first engages the end face 18b of the nut 12b.

After the nut 12a has been turned to the desired angular position and while the nut 12a is being held by the wrench, the screws 32 are tightened to draw the clamping ring 28 toward the flange 20b. As an incident thereto, the clamping surface 28' of the clamping ring engages and presses against the clamping surface 26a' of the collar 26a of the nut 12a. When the wrench is released from the nut 12a, the frictional engagement of the surface 28' with the surface 26a' prevents the nut 12a from being rotated relative to the nut 12b by the preloaded balls 14. Such rotation also is prevented by virtue of the end face 18a frictionally engaging the end face 18b.

Alternatively, the preloading may be effected by rotating the nut 12a a short distance away from the nut 12b to create a very narrow gap between the end faces 18a and 18b. By then holding the nut 12a against rotation and tightening the screws 32, the nut 12a may be drawn axially toward the nut 12b to eliminate or virtually eliminate the gap and preload the nuts 12a and 12b. The frictional engagement of the surfaces 26a' and 28' prevents relative rotation of the nuts 12a and 12b after tightening of the screws.

The foregoing arrangement is of simple construction, enables quick and easy preloading of the assembly and permits stepless locking of the nuts 12a and 12b. That is to say, the nuts need not be in any particular or predetermined angular position relative to one another but instead can be locked against relative rotation regardless of their relative angular positions. As a result, the degree of preloading can be established with high precision and, in addition, the relative angular positions of the nuts can be adjusted to re-establish the degree of preloading when necessary.

Figure 2:
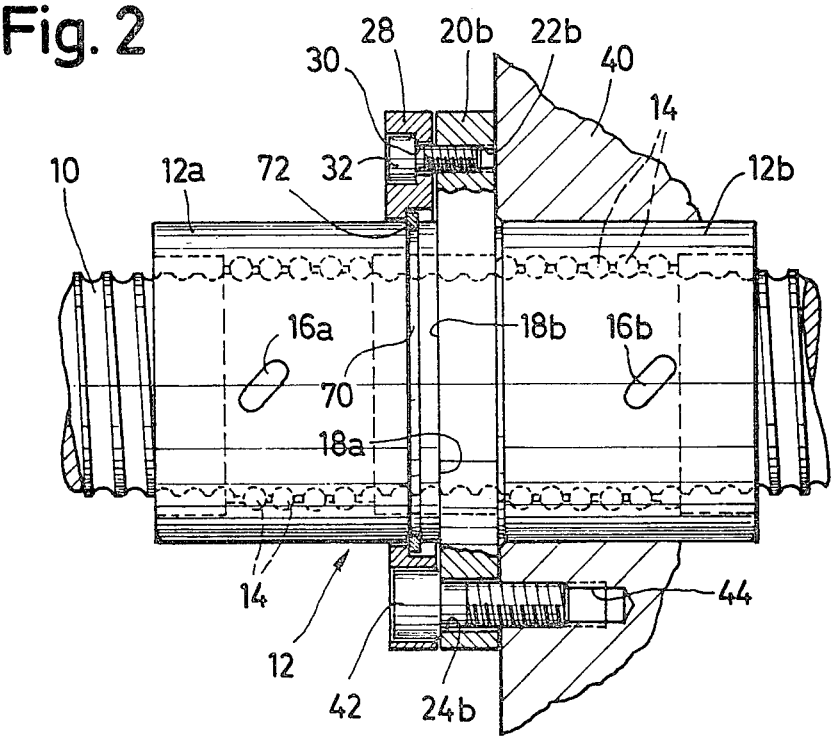
FIG. 2 is a view similar to FIG. 1 but shows another embodiment of a ball screw assembly incorporating the features of the invention.

Another embodiment of the ball screw assembly is shown in FIG. 2. This embodiment differs from the first embodiment only in that the annular collar 26a of the first embodiment is replaced by a washer 72 inserted into an annular groove 70 in the nut 12a. Accordingly, the second embodiment need not be described in further detail.

I claim:

1. A ball screw assembly comprising a screw having a ball groove, first and second axially alined nuts each having a ball groove, and balls located between the groove of said screw and the grooves of said nuts and adapted to circulate within said grooves, the improvement in said assembly comprising, a locking member having a clamping surface which faces generally axially toward said first nut, said second nut having a clamping surface which faces axially toward and which is adapted to frictionally engage the clamping surface of said locking member, and selectively releasable threaded means connecting said locking member to said first nut and operable when tightened to draw said locking member toward said first nut and to press the clamping surface of said locking member frictionally against the clamping surface of said second nut to prevent relative rotation between said nuts and to hold said balls in a preloaded condition in said grooves.

2. A ball screw assembly as defined in claim 1 in which said clamping surface of said second nut is defined by an axially facing annular shoulder on said second nut, said locking member comprising a ring telescoped over said second nut and engageable with said shoulder.

3. A ball screw assembly as defined in claim 2 in which said threaded means comprise a series of threaded connectors spaced angularly around said nuts and extending axially between said ring and said first nut.

4. A ball screw assembly comprising a screw having a ball groove, first and second axially alined nuts each having a ball groove, and balls located between the groove of said screw and the grooves of said nuts and adapted to circulate within said grooves, the adjacent end faces of said nuts being jammed against one another by relative rotation of said nuts thereby to preload said balls in said grooves, the improvement in said assembly comprising, a locking member having a clamping surface which faces generally axially toward said first nut, a clamping surface on said second nut and disposed in opposing relation with the clamping surface on said locking member, and a threaded connector extending axially between said locking member and said first nut and operable when tightened to draw the clamping surface of said locking member axially into engagement with the clamping surface of said second nut whereby relative rotation between said nuts is prevented by virtue of said clamping surfaces frictionally engaging one another.

5. A ball screw assembly comprising a screw having a helical ball groove, first and second axially alined nuts each having a helical ball groove, and balls located between the groove of said screw and the grooves of said nuts and adapted to circulate within said grooves, the adjacent end faces of said nuts being jammed against one another by relaive rotation of said nuts thereby to preload said balls in said grooves, the improvement in said assembly comprising, a locking ring telescoped over said second nut and having a clamping surface which faces generally axially toward said first nut, an annular shoulder on said second nut and disposed in opposing relation with said clamping surface, and a series of threaded connectors spaced angularly around said nuts and extending axially between said first nut and said locking ring to prevent relative rotation between said first nut and said ring, said connectors being operable when tightened to draw the clamping surface of said ring axially into engagement with the shoulder of said second nut whereby relative rotation between said nuts is prevented by virtue of said clamping surface frictionally engaging said shoulder.

* * * * *